(12) United States Patent
Nieuwoudt et al.

(10) Patent No.: US 10,953,382 B2
(45) Date of Patent: Mar. 23, 2021

(54) STRUCTURED PACKING MODULE FOR MASS TRANSFER COLUMNS

(71) Applicant: KOCH-GLITSCH, LP, Wichita, KS (US)

(72) Inventors: Izak Nieuwoudt, Wichita, KS (US); Scott Clifford, Wichita, KS (US)

(73) Assignee: KOCH-GLITSCH, LP, Wichita, KS (US)

( * ) Notice: Subject to any disclaimer, the term of this patent is extended or adjusted under 35 U.S.C. 154(b) by 166 days.

(21) Appl. No.: 15/995,225

(22) Filed: Jun. 1, 2018

(65) Prior Publication Data

US 2018/0353927 A1 Dec. 13, 2018

Related U.S. Application Data

(60) Provisional application No. 62/517,368, filed on Jun. 9, 2017.

(51) Int. Cl.
*B01J 19/32* (2006.01)
*B01J 19/30* (2006.01)

(52) U.S. Cl.
CPC .............. *B01J 19/32* (2013.01); *B01J 19/305* (2013.01); *B01J 2219/3221* (2013.01); *B01J 2219/3284* (2013.01); *B01J 2219/32213* (2013.01); *B01J 2219/32227* (2013.01); *B01J 2219/32244* (2013.01); *B01J 2219/32248* (2013.01); *B01J 2219/32251* (2013.01);
(Continued)

(58) Field of Classification Search
CPC .. B01J 19/32; B01J 19/305; B01J 2219/3221; B01J 2219/32213; B01J 2219/32227; B01J 2219/32244; B01J 2219/32248; B01J 2219/32251; B01J 2219/32258; B01J 2219/32275; B01J 2219/32286; B01J 2219/32296; B01J 2219/3284
USPC ................................ 261/94, 112.2, DIG. 72
See application file for complete search history.

(56) References Cited

U.S. PATENT DOCUMENTS 3,475,012 A * 10/1969 Britton .................. F28F 25/087
261/112.2
3,540,702 A * 11/1970 Uyama .................... B01J 19/32
261/112.2
(Continued)

FOREIGN PATENT DOCUMENTS

WO WO2004030809 A1 4/2004

OTHER PUBLICATIONS

International Search Report & Written Opinion for corresponding PCT Application No. PCT/IB2018/053995, 11 pages.

*Primary Examiner* — Charles S Bushey (57) ABSTRACT

A corrugated structured packing sheet has surface texturing that may be in the form of a grid of indented and raised structures. Each indented structure is separated from some or all of adjacent ones of the indented structures by the raised structures. The raised structures form rows of peaks and interconnecting saddles. Microchannels extend along adjacent ones of the indented structures and the interconnecting saddles and intersect the corrugation valleys at an angle in the range of 20 to 75 degrees. The surface texturing may be or include wavy parallel grooves in an upper edge region adjacent the upper edge and a lower edge region adjacent the lower edge and may be or include parallel groove segments in the bulk region that are oriented obliquely to upper and lower edges of the structured packing sheet.

20 Claims, 8 Drawing Sheets

(52) U.S. Cl.
CPC .............. *B01J 2219/32258* (2013.01); *B01J 2219/32275* (2013.01); *B01J 2219/32286* (2013.01); *B01J 2219/32296* (2013.01)

(56) References Cited

U.S. PATENT DOCUMENTS

| | | | | |
|---|---|---|---|---|
| 3,775,234 | A * | 11/1973 | Rich | B21D 47/00 428/183 |
| 4,374,542 | A * | 2/1983 | Bradley | B01F 5/0617 159/28.6 |
| 4,512,938 | A | 4/1985 | Jones et al. | |
| 4,634,534 | A * | 1/1987 | Cominetta | B01J 19/32 210/150 |
| 4,668,443 | A * | 5/1987 | Rye | B01D 47/00 165/166 |
| 4,670,197 | A * | 6/1987 | Stackhouse | B01J 19/32 261/112.2 |
| 4,740,334 | A | 4/1988 | Rukovena, Jr. | |
| 4,800,047 | A * | 1/1989 | Monjoie | F28F 25/087 261/112.2 |
| 4,882,130 | A | 11/1989 | Asai et al. | |
| 5,073,236 | A * | 12/1991 | Gelbein | B01D 3/009 202/158 |
| 5,124,087 | A | 6/1992 | Bradley et al. | |
| 5,413,741 | A | 5/1995 | Buchholz et al. | |
| 5,624,733 | A * | 4/1997 | McKeigue | B01J 19/32 261/112.2 |
| 6,378,332 | B1 | 4/2002 | Billingham et al. | |
| 6,509,082 | B1 | 1/2003 | Mc Keigue et al. | |
| 6,511,051 | B2 * | 1/2003 | Kessler | B01J 19/32 261/112.2 |
| 6,869,066 | B2 * | 3/2005 | Koo | F28F 25/087 261/112.2 |
| 7,025,339 | B2 | 4/2006 | Meski et al. | |
| 8,944,417 | B2 * | 2/2015 | Ausner | B01J 19/32 261/112.2 |
| 2015/0231597 | A1 | 8/2015 | Raynal et al. | |
| 2016/0121297 | A1 | 5/2016 | Wehrli | |

\* cited by examiner

STRUCTURED PACKING MODULE FOR MASS TRANSFER COLUMNS

CROSS REFERENCE TO RELATED APPLICATIONS

This present applications claims priority to U.S. Provisional Patent Application No. 62/517,368 filed Jun. 9, 2017 the disclosures of which are incorporated by reference herein.

BACKGROUND

The present invention relates generally to mass transfer columns and, more particularly, to structured packing used to facilitate mass and heat transfer between fluids in such columns.

Mass transfer columns are configured to contact at least two fluid streams in order to provide product streams of specific composition and/or temperature. The term "mass transfer column," as used herein is intended to encompass columns in which mass and/or heat transfer is the primary objective. Some mass transfer columns, such as those utilized in multicomponent distillation and absorption applications, contact a gas-phase stream with a liquid-phase stream, while others, such as extraction columns, may be designed to facilitate contact between two liquid phases of different densities. Oftentimes, mass transfer columns are configured to contact an ascending vapor or liquid stream with a descending liquid stream, usually along multiple mass transfer surfaces disposed within the column. Commonly, these transfer surfaces are defined by structures placed in the interior volume of the column that are configured to facilitate intimate contact between the two fluid phases. As a result of these transfer surfaces, the rate and/or degree of mass and heat transferred between the two phases is enhanced.

Structured packing is used in columns to provide the heat and/or mass transfer surfaces. One type of structured packing uses a plurality of crimped sheets that form corrugations comprised of alternating peaks and valleys. The corrugated structured packing sheets are positioned in an upright, parallel relationship to each other and are arranged so that the corrugations of each sheet extend at an angle to a longitudinal axis of the column and at an angle with respect to the corrugations of each adjacent sheet in a crisscrossing relationship. The structured packing sheets are joined together to form a structured packing module in which fluid passages are formed in the valleys of the crisscrossing corrugations. The structured packing module may form a structured packing layer that fills a horizontal internal cross section of the column or the structured packing module may be in the form of individual bricks that are positioned end-to-end and side-by-side to form the structured packing layer. Multiple structured packing layers are normally stacked on top of each other with the orientation of the sheets in one layer rotated with respect to the sheets in adjacent structured packing layers.

Various types of surface texturing have been applied to the structured packing sheets in order to facilitate the spreading of the liquid phase across the surface of the structured packing sheets and thereby maximize mass and energy transfer between the vapor and liquid phases as they flow through the structured packing layer. A single type of surface texturing is normally applied over the entire surface area of the structured packing sheet. One type of surface texturing uses grooves that extend in a lateral direction that is parallel to a top and a bottom edge of the structured packing sheet. If the structured packing sheet is not level, the grooves will be inclined from the horizontal and the liquid that travels along the grooves will preferentially flow in one direction, leading to maldistribution of the liquid and a reduction in the mass transfer efficiency.

Another type of surface texturing that normally has a higher mass transfer efficiency than the grooves comprises a uniform grid of indented and raised structures in which each indented structure is separated from an adjacent indented structure by a raised structure. The indented structures on one face of the structured packing sheet form the raised structures on the opposite face of the structured packing sheet and vice versa.

The raised structures that surround the indented structures form rows comprising peaks and interconnecting saddles, with the saddles and indented structures forming rows of microchannels along which liquid preferentially flows. The rows and microchannels are inclined and intersect the top and bottom edges of the structured packing sheet at an angle, such as a 45 degree angle. It has been found that the spreading pattern of the liquid is influenced by these microchannels. When they are in general alignment with the corrugation valleys, once the liquid enters a corrugation valley it tends to follow the microchannels and remain within the corrugation valley. Ideally, the liquid would be able to exit the corrugation valleys by flowing over the corrugation peaks and entering other corrugation valleys to facilitate lateral spreading of the liquid.

A need thus exists for an improved structured packing on which liquid is able to more uniformly spread across the structured packing surfaces, increasing the active and effective surface area on which liquid-vapor interaction is occurring, and thereby obtain increases in mass transfer efficiency.

SUMMARY

In one aspect, the present invention is directed to a structured packing module comprising a plurality of structured packing sheets positioned in an upright, parallel relationship to each other, each structured packing sheet having opposite faces, an upper edge, a lower edge, a bulk region between the upper edge and the lower edge, and corrugations formed of alternating peaks and valleys that are interconnected by corrugation sidewalls and extend in an inclined direction that forms an oblique inclination angle in relation the upper edge and/or the lower edge of the structured packing sheet, the structured packing sheets being constructed and arranged such that the corrugations of adjacent ones of the structured packing sheets extend obliquely to each other. The structured packing module further comprises surface texturing on the structured packing sheets comprising a grid of indented and raised structures in the bulk region with each indented structure being separated from some or all of adjacent ones of the indented structures by the raised structures, the raised structures forming rows of peaks and interconnecting saddles, and microchannels that extend along adjacent ones of the indented structures and the interconnecting saddles that are positioned between each of the adjacent ones of the indented structures. The microchannels intersect the corrugation valleys at an angle in the range of 20 to 75 degrees.

In another aspect, the present invention is directed to a structured packing sheet described in the structured packing module above.

In a further aspect, the present invention is directed to a structured packing sheet comprising opposite faces, an upper edge, a lower edge, a bulk region between the upper edge and the lower edge, corrugations formed of alternating peaks and valleys that are interconnected by corrugation sidewalls and extend in an inclined direction that forms an oblique inclination angle in relation the upper edge and/or the lower edge, and apertures. The structured packing sheet further comprises surface texturing on the structured packing sheets comprising parallel grooves in an upper edge region adjacent the upper edge and a lower edge region adjacent the lower edge, parallel groove segments in the bulk region that are oriented obliquely to the upper and lower edges, a grid of indented and raised structures in the bulk region and covering 70 to 95 percent of a total surface area of the structured packing sheet, each indented structure being separated from some or all of adjacent ones of the indented structures by the raised structures, the raised structures forming rows of peaks and interconnecting saddles, wherein the indented structures are arranged in parallel rows with the interconnecting saddles of the raised structures connecting adjacent indented structures within each row, and microchannels that extend along adjacent ones of the indented structures and the interconnecting saddles that are positioned between each of the adjacent ones of the indented structures.

BRIEF DESCRIPTION OF THE DRAWINGS

In the accompanying drawings that form part of the specification and in which like numbers are used to indicate like components in the various views.

DETAILED DESCRIPTION

Figure 1:
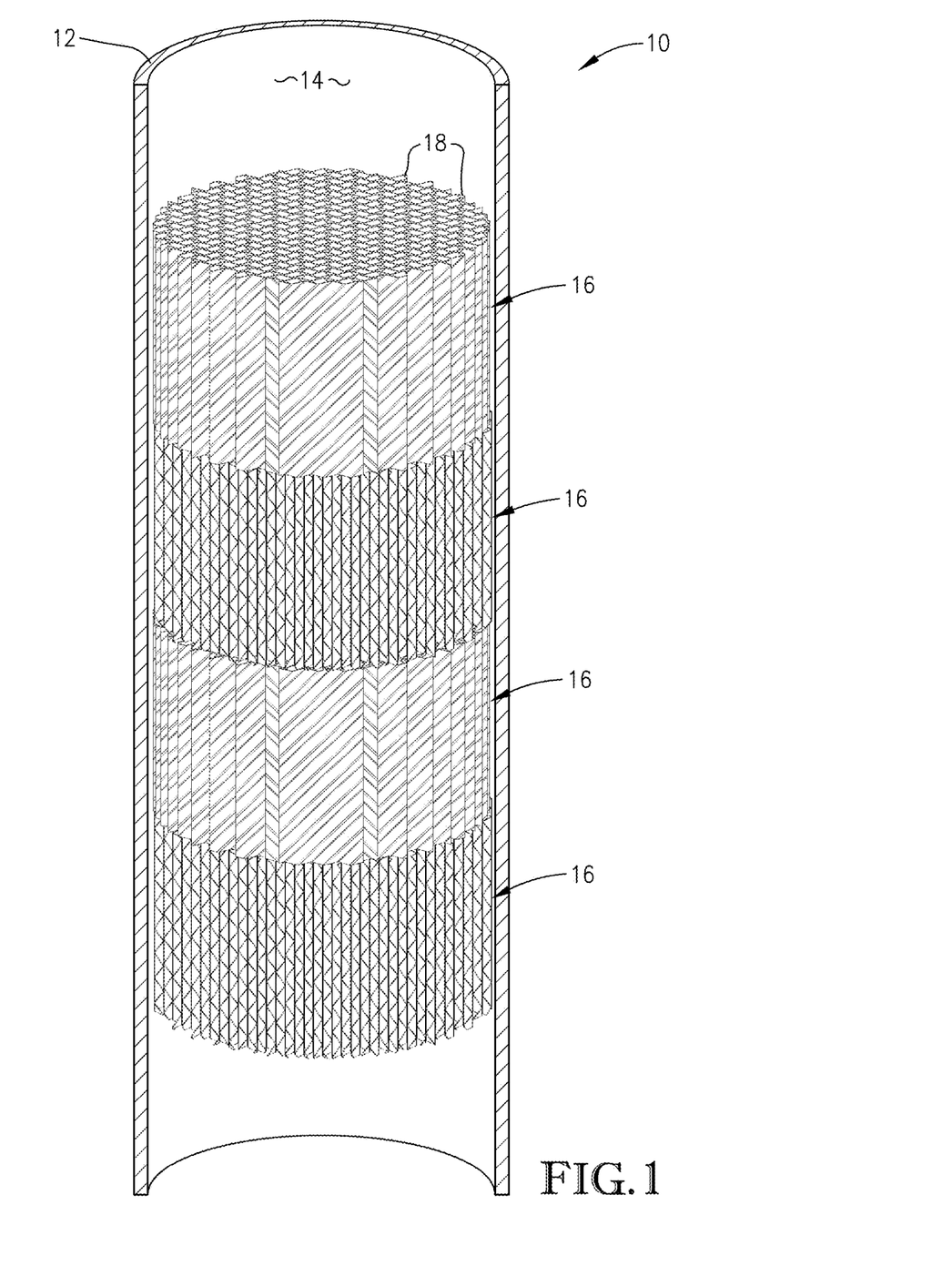
FIG. 1 is a fragmentary side elevation view of a mass transfer column with the column shell taken in vertical section to show structured packing layers of the present invention positioned in a stacked arrangement within the column.

Turning now to the drawings in greater detail and initially to FIG. 1, a mass transfer column suitable for use in mass transfer and heat exchange processes is represented generally by the numeral 10. The mass transfer column 10 includes an upright, external shell 12 that is generally cylindrical in configuration, although other configurations, including polygonal, are possible and are within the scope of the present invention. The shell 12 is of any suitable diameter and height and is constructed from one or more rigid materials that are desirably inert to, or are otherwise compatible with, the fluids and conditions present during operation of the mass transfer column 10.

The shell 12 of the mass transfer column 10 defines an open internal region 14 in which the desired mass transfer and/or heat exchange between the fluid streams occurs. Normally, the fluid streams comprise one or more ascending vapor streams and one or more descending liquid streams. Alternatively, the fluid streams may comprise both ascending and descending liquid streams. The fluid streams are directed into the mass transfer column 10 through any number of feed lines (not shown) positioned at appropriate locations along the height of the mass transfer column 10. One or more vapor streams can also be generated within the mass transfer column 10 rather than being introduced into the column 10 through the feed lines. The mass transfer column 10 will also typically include an overhead line (not shown) for removing a vapor product or byproduct and a bottom stream takeoff line (not shown) for removing a liquid product or byproduct from the mass transfer column 10. Other column components that are typically present, such as feed points, sidedraws, reflux stream lines, reboilers, condensers, vapor horns, liquid distributors, and the like, are not illustrated in the drawings because an illustration of these components is not believed to be necessary for an understanding of the present invention.

In accordance with the present invention, one or more structured packing layers 16 comprising individual structured packing sheets 18 are positioned within the open internal region 14 and extend across the horizontal, internal cross section of the mass transfer column 10. In the illustrated embodiment, four structured packing layers 16 are placed in vertically-stacked relationship to each other, but it is to be understood that more or fewer structured packing layers 16 may be provided. In one embodiment, each one of the structured packing layers 16 is formed as a single structured packing module that extends completely across the horizontal, internal cross section of the column 10. In another embodiment, each structured packing layer 16 is formed as a plurality of individual structured packing modules (not shown), referred to as bricks, that are positioned in end-to-end and side-to-side relationship to fill the horizontal, internal cross section of the mass transfer column 10.

The structured packing layers 16 are each suitably supported within the mass transfer column 10, such as on a support ring (not shown) that is fixed to the shell 12, on an underlying one of the structured packing layers 16, or by a grid or other suitable support structure. In one embodiment, the lowermost structured packing layer 16 is supported on a support structure and the overlying structured packing layers 16 are stacked one on top of the other and are supported by the lowermost structured packing layer 16. Successive structured packing layers 16 are typically rotated relative to each other so that the individual structured packing sheets 18 in one of the packing layers 16 are positioned in vertical planes that extend at an angle with respect to the vertical planes defined by the individual structured packing sheets 18 in the adjacent one(s) of the packing layers 16. This rotation angle is typically 45 or 90 degrees, but can be other angles if desired. The height of each structured packing element 16 may be varied, depending on the particular application. In one embodiment, the height is within the range of from about 50 to about 400 mm.

The structured packing sheets 18 in each structured packing layer 16 are positioned in an upright, parallel relationship to each other. Each of the structured packing sheets 18 is constructed from a suitably rigid material, such as any of various metals, plastics, or ceramics, having sufficient strength and thickness to withstand the processing conditions experienced within the mass transfer column 10.

Figure 2:
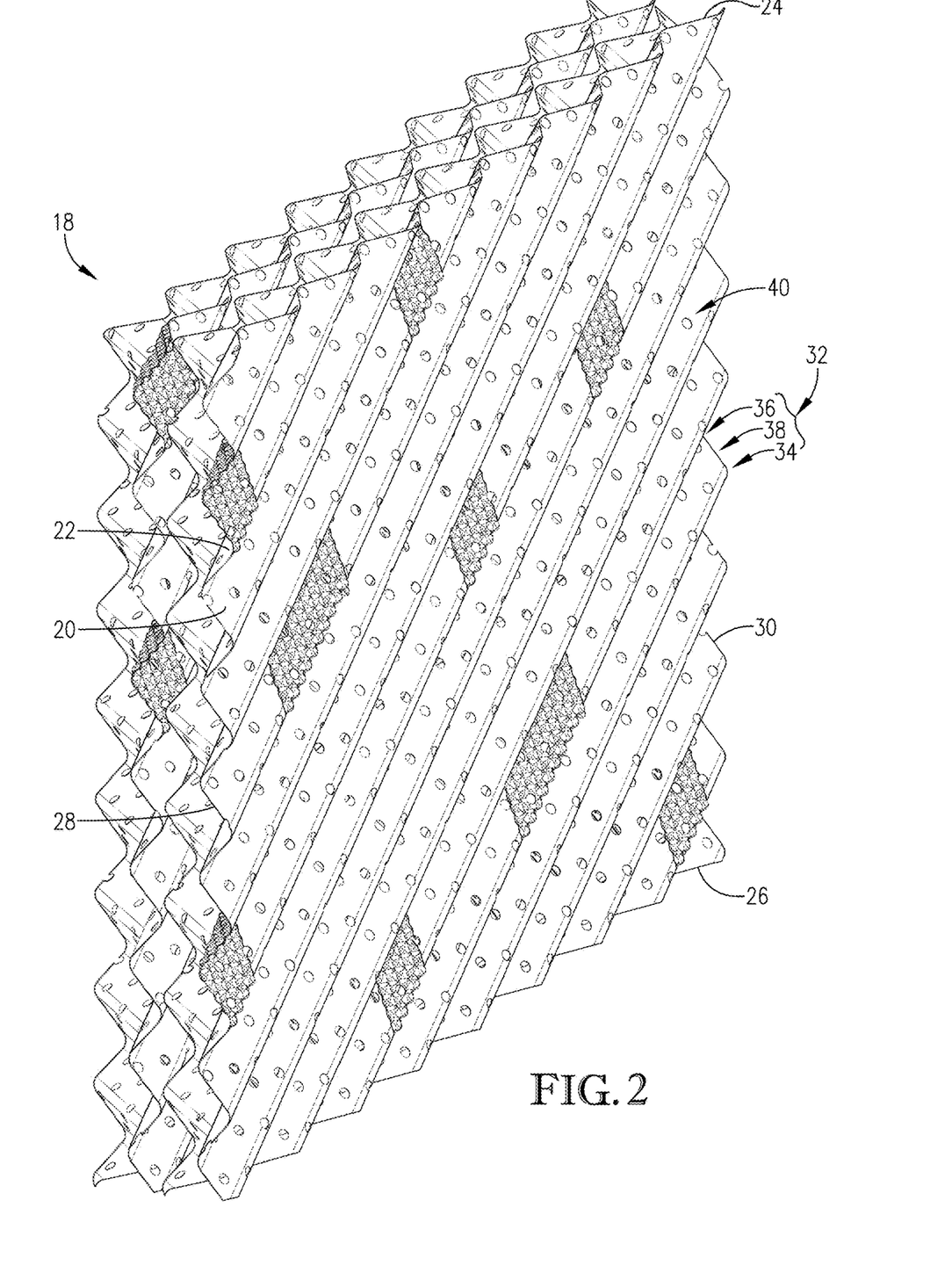
FIG. 2 is a side perspective view of four corrugated structured packing sheets that form a portion of a structured packing module and have apertures and an embodiment of a surface texturing that comprises a grid of indented and raised structures, wherein the surface texturing is representationally shown covering only certain portions of the sheets for ease of viewing and understanding, but which may, in fact, cover the entire sheets.

Turning additionally to FIG. 2, each of the structured packing sheets 18 presents opposite front and back faces 20 and 22, opposite upper and lower edges 24 and 26, and opposite side edges 28 and 30. Each of the structured packing sheets 18 has a plurality of parallel corrugations 32 that extend along a portion, or all, of the associated structured packing sheet 18. The corrugations 32 are formed of alternating peaks 34 and valleys 36 and corrugation sidewalls 38 that extend between adjacent ones of the peaks 34 and valleys 36. The peaks 34 on the front face 20 of each structured packing sheet 18 form valleys 36 on the opposite or back face 22 of the structured packing sheet 18. Likewise, the valleys 36 on the front face 20 of each structured packing sheet 18 form the peaks 34 on the back face 22 of the structured packing sheet 18.

In the illustrated embodiments, the corrugations 32 of each one of the structured packing sheets 18 extend along the entire height and width of the structured packing sheet 18 and are generally of a triangular or sinusoidal cross section. Adjacent ones of the structured packing sheets 18 in each structured packing layer 16 are positioned in facing relationship so that the front face 20 of one of the structured packing sheets 18 faces the back face 22 of the adjacent structured packing sheet 18. The adjacent structured packing sheets 18 are further arranged so that the corrugations 32 in each one of the structured packing sheets 18 extends in a crisscrossing, or cross-corrugated, manner to those corrugations 32 in the adjacent one(s) of the structured packing sheets 18. As a result of this arrangement, the corrugations 32 in each one of the structured packing sheets 18 extend at an oblique angle to the corrugations of each adjacent one of the structured packing sheets 18. Some, all or none of the peaks 34 of the corrugations 32 on the front face 20 of each one of the structured packing sheets 18 may be in contact with the peaks 34 on the back face 22 of the adjacent one of the structured packing sheets 18.

The corrugations 32 are inclined in a direction that forms an inclination angle in relation to the upper and/or lower edges 24 and 26 of the structured packing sheet 18. The inclination angle that may be selected for the requirements of particular applications in which the structured packing sheets 18 are to be used. In one embodiment, the inclination angle may be in the range of 25 to 75 degrees. Specific examples of inclination angles are approximately 30°, approximately 45°, and approximately 60°. Because the upper and lower edges 24 and 26 of the structured packing sheets 18 are positioned perpendicularly to the vertical axis of the mass transfer column 10, the corrugations 32 are also inclined in relation to the vertical axis of the mass transfer column 10.

Figure 3:
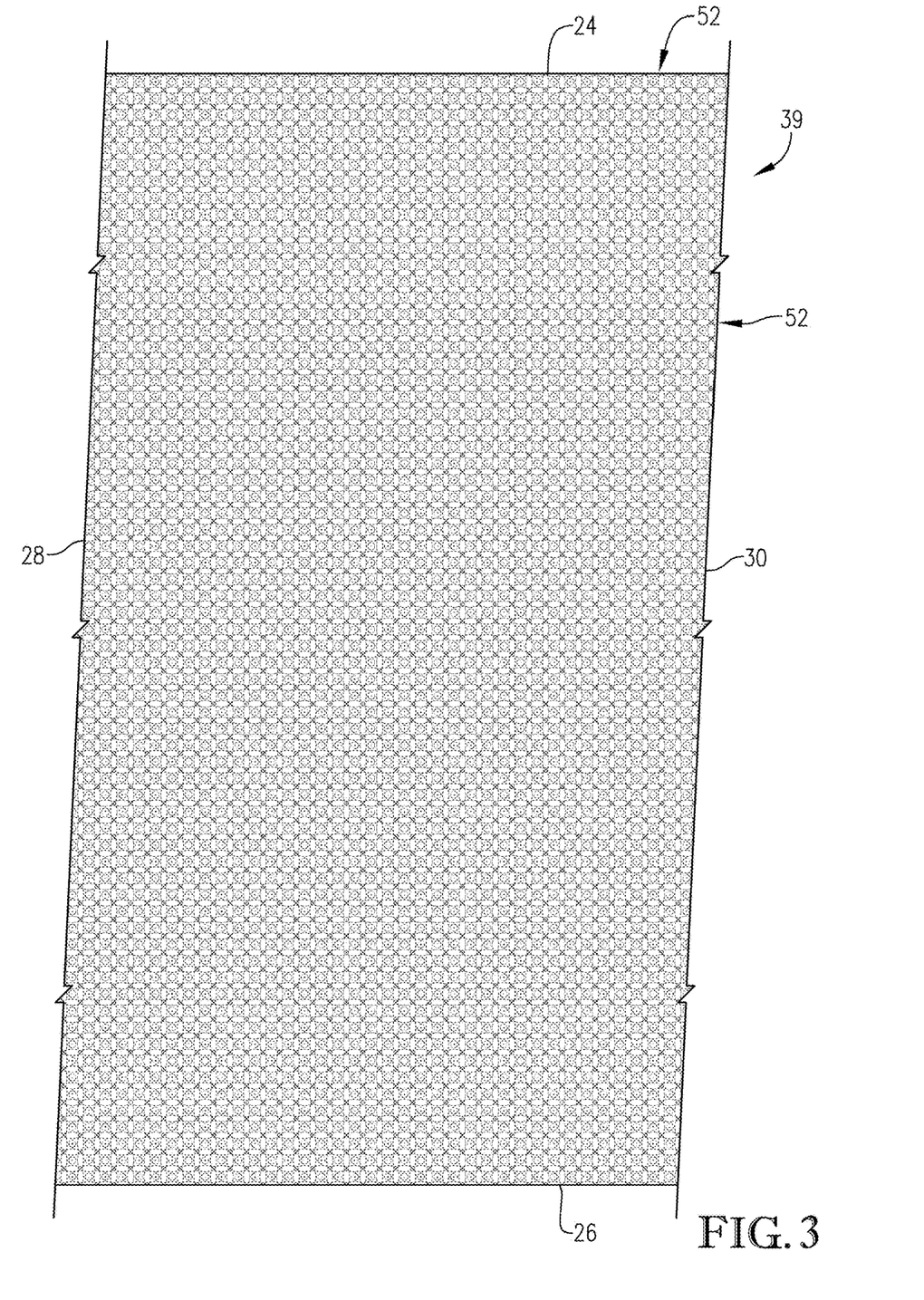
FIG. 3 is a front perspective view of a flat sheet of material before it is subjected to a crimping operation to form the corrugations, the sheet of material having apertures and an embodiment of surface texturing comprising the grid of indented and raised structures.

The peaks 34, valleys 36 and corrugation sidewalls 38 of the corrugations 32 are normally formed in an automated crimping process by feeding a flat sheet 39, such as shown in FIG. 3, into a crimping press. The peaks 34 and valleys 36 are generally formed as curved arcs that may be defined by an apex radius. In general, as the apex radius increases, the arc of curvature of the peaks 34 and valleys 36 increases and the length of the corrugation sidewalls 38 between the peaks 34 and valleys 36 conversely decreases, for a given specific surface area. The two corrugation sidewalls 38 of each corrugation 32 form an apex angle. Apex radius, apex angle, packing crimp height, and peak 34 to peak 34 length are interrelated, and may be varied to achieve a desired geometry and specific surface area. In general, as crimp height is lowered the number of structured packing sheets 18 contained in each structured packing layer 16 (or module), and the associated specific surface area, increases.

Some or all of the structured packing sheets 18 may be provided with a plurality of apertures 40 that extend through the structured packing sheet 18 for facilitating vapor and liquid distribution within the structured packing layer 16. Each aperture 40 provides an open area for permitting the passage of fluid through the associated packing sheet 18. The apertures 40 are normally uniformly distributed on the structured packing sheets 18.

The front and/or back faces 20 and 22 of the structured packing sheets 18 contain one or more different types of surface texturing to facilitate spreading and thereby maximize contact between the ascending and descending fluid streams. In one embodiment as shown in FIG. 2, the surface texturing comprises a grid of indented structures 44 and raised structures 46 in a bulk region of the front and back faces 20 and 22 of the structured packing sheets 18. Only a few representative areas of the grid of indented and raised structures 44 and 46 are shown in FIG. 2 in order to allow the corrugations 32 to be readily seen, but it is to be understood that the grid may cover the entire surface area of the structured packing sheet 18 or sufficient portions thereof to achieve the desired mass transfer efficiency. The bulk region in one embodiment is located between the upper and lower edges 24 and 26 of the structured packing sheet 18.

Figure 6:
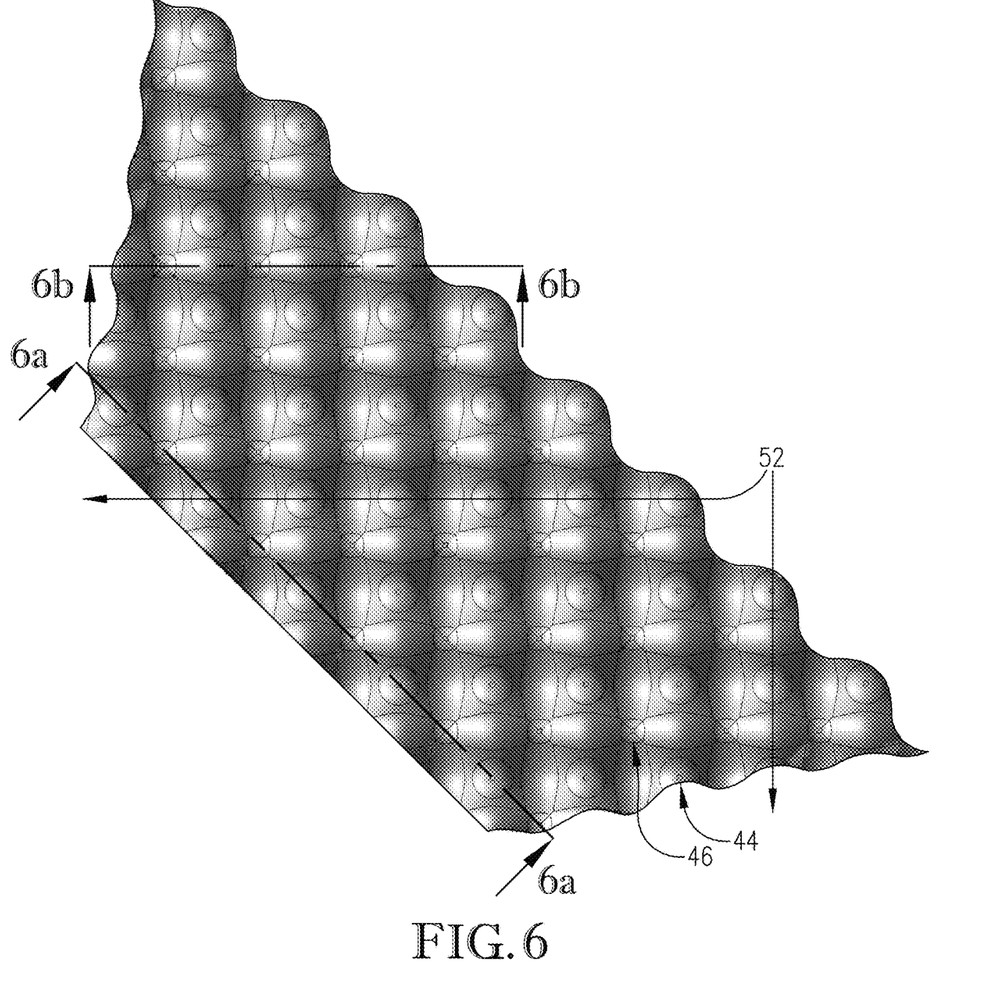
FIG. 6 is an enlarged fragmentary view of an embodiment of the grid of indented and raised structures comprising cone-shaped peaks and valleys.
Figure 6A:
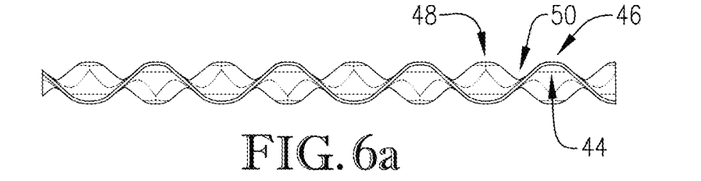
FIG. 6a is a cross-sectional view along line 6a-6a of FIG. 6.
Figure 6B:
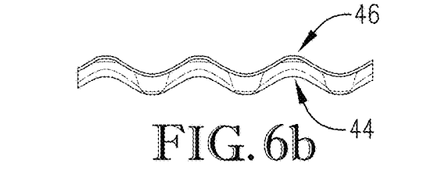
FIG. 6b is a cross-sectional view along line 6b-6b of FIG. 6.
Figure 7:
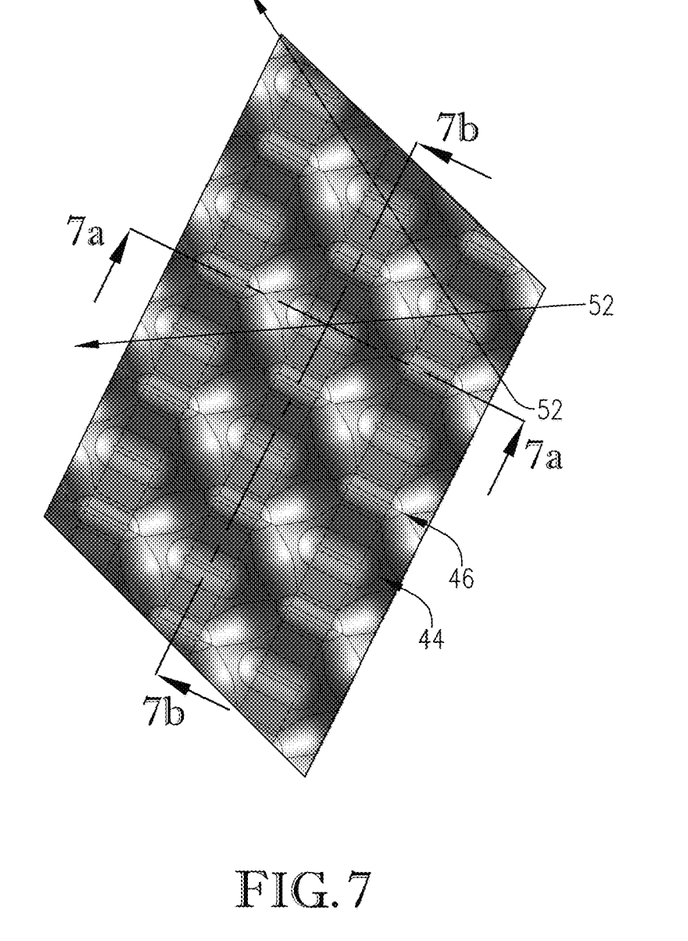
FIG. 7 is an enlarged fragmentary view of an embodiment of the grid of indented and raised structures comprising elongated ridge-shaped peaks and valleys.
Figure 7A:
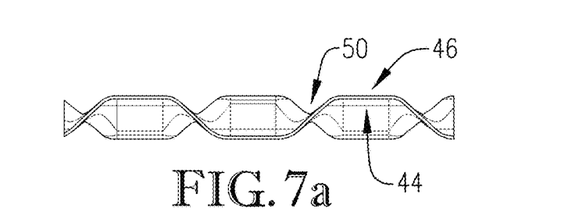
FIG. 7a is a cross-sectional view along line 7a-7a of FIG. 7.
Figure 7B:
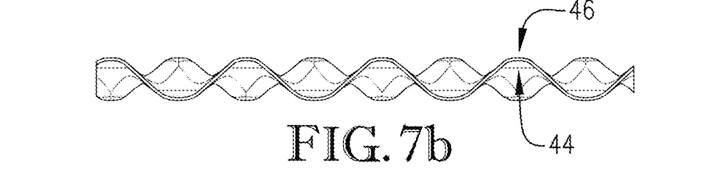
FIG. 7b is a cross-sectional view along line 7b-7b of FIG. 7.

Each indented structured 44 is separated from some or all of the adjacent ones of the indented structures 44 by the raised structures 46. The indented structures 44 are arranged in parallel rows and may be positioned in a square, diamond, triangular or other pattern. The raised structures 46 comprise peaks 48 and interconnecting saddles 50. The peaks 48 may be generally cone-shaped as shown in FIGS. 6, 6a, and 6b and 8, 8a, and 8b or they may be elongated to form ridge shapes as shown in FIGS. 7, 7a, 7b. Other shapes and/or configurations are possible and are within the scope of the invention. Normally, at least some portions of the raised structures 46 on the front face 20 are formed by at least some portions of the indented structures 44 on the back face 22, and vice versa. Thus, each of the cone-shaped peaks 48 may be formed by the cone-shaped terminus of one of the indented structures 44 on the opposite face 20 or 22 of the structured packing sheet 18. Likewise, each of the ridge-shaped peaks 48 may be formed by the ridge-shaped terminus of one of the indented structures 44 on the opposite face 20 or 22 of the structured packing sheet 18.

The surface texturing includes microchannels designated by the arrows 52 that extend along adjacent ones of the indented structures 44 and the interconnecting saddles 50 of the raised structures 46 that are positioned between adjacent ones of the indented structures 44. These microchannels 52 intersect rather than extend parallel or largely parallel to the corrugation valleys 36 to facilitate the spreading of the liquid across the front and back faces 20 and 22 of the structured packing sheets 18. The intersection angle of the microchannels 52 to the upper and/or lower edges 24 and 26 of the structured packing sheet 18, and thus the orientation of the microchannels 52 relative to the corrugation valleys 36, is selected to optimize the liquid spreading on the front and back faces 20 and 22.

In one embodiment, the microchannels 52 intersect the corrugation valleys 36 at an angle in the range of 20 to 75 degrees, where the intersection angle is understood to be the smallest of the possible intersection angles formed between the corrugation valleys 36 and the microchannels 52. In other embodiments, the angle may be in the range of 25 to 70 degrees or 30 to 65 degrees. As can be seen in the embodiment illustrated in FIG. 3, the crossing microchannels 52 may be oriented generally parallel to the upper and lower edges 24 and 26 and to the side edges 28 and 30, respectively, in a flat sheet 54 of material before it is subjected to the crimping operations to form one of the corrugated structured packing sheets 18.

Figure 8:
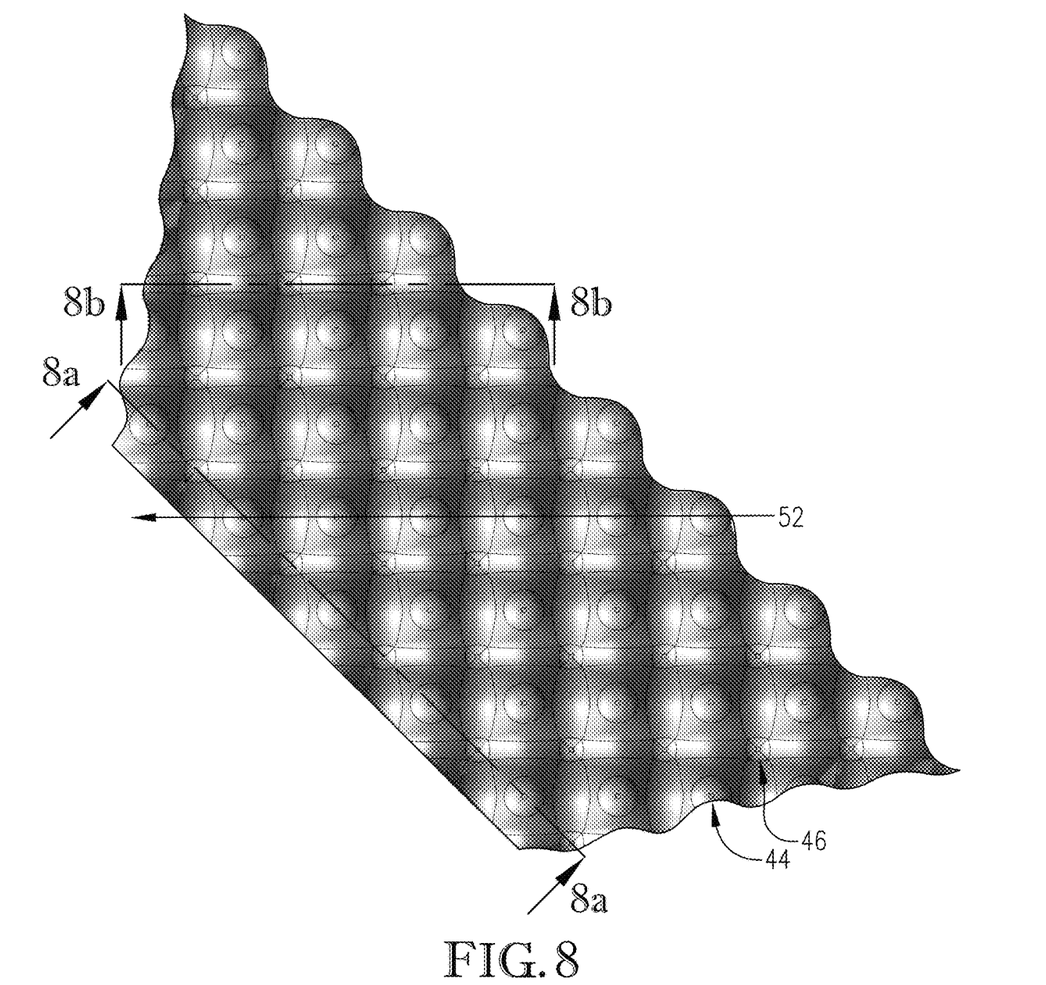
FIG. 8 is an enlarged fragmentary view of an embodiment of the grid of indented and raised structures comprising cone-shaped peaks and valleys and having higher saddles between rows of peaks and lower saddles between columns of peaks.
Figure 8A:
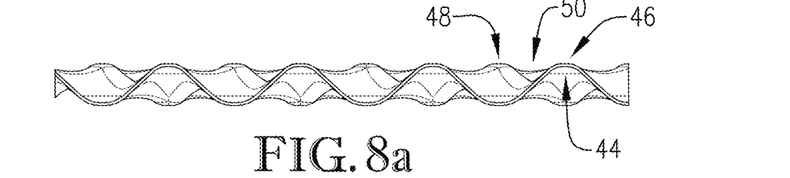
FIG. 8a is a cross-sectional view along line 8a-8a of FIG. 8.
Figure 8B:
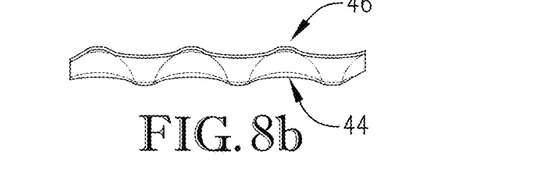
FIG. 8b is a cross-sectional view along line 8b-8b of FIG. 8.

Two of the microchannels 52 extend obliquely to each other at each indented structure 44 at a crossing angle. The crossing angle in one embodiment may be in the range of 50 to 140 degrees. In other embodiments, the crossing angle may be in the range of 70 to 130 degrees or 85 to 95 degrees. The microchannels 52 may extend linearly as shown in FIG. 6, they may extend in a zigzag fashion as shown in FIG. 7, or they may extend in other fashions as shown in FIG. 8. For example, in the embodiment of FIG. 8, the interconnecting saddles 50 of the raised structures 46 are higher between rows of peaks 48, which forms more of a barrier to fluid flow, and lower between columns of peaks 48, which forms less of a barrier to fluid flow, so that more fluid flows in the microchannels 52 between rows of peaks 48.

Figure 4:
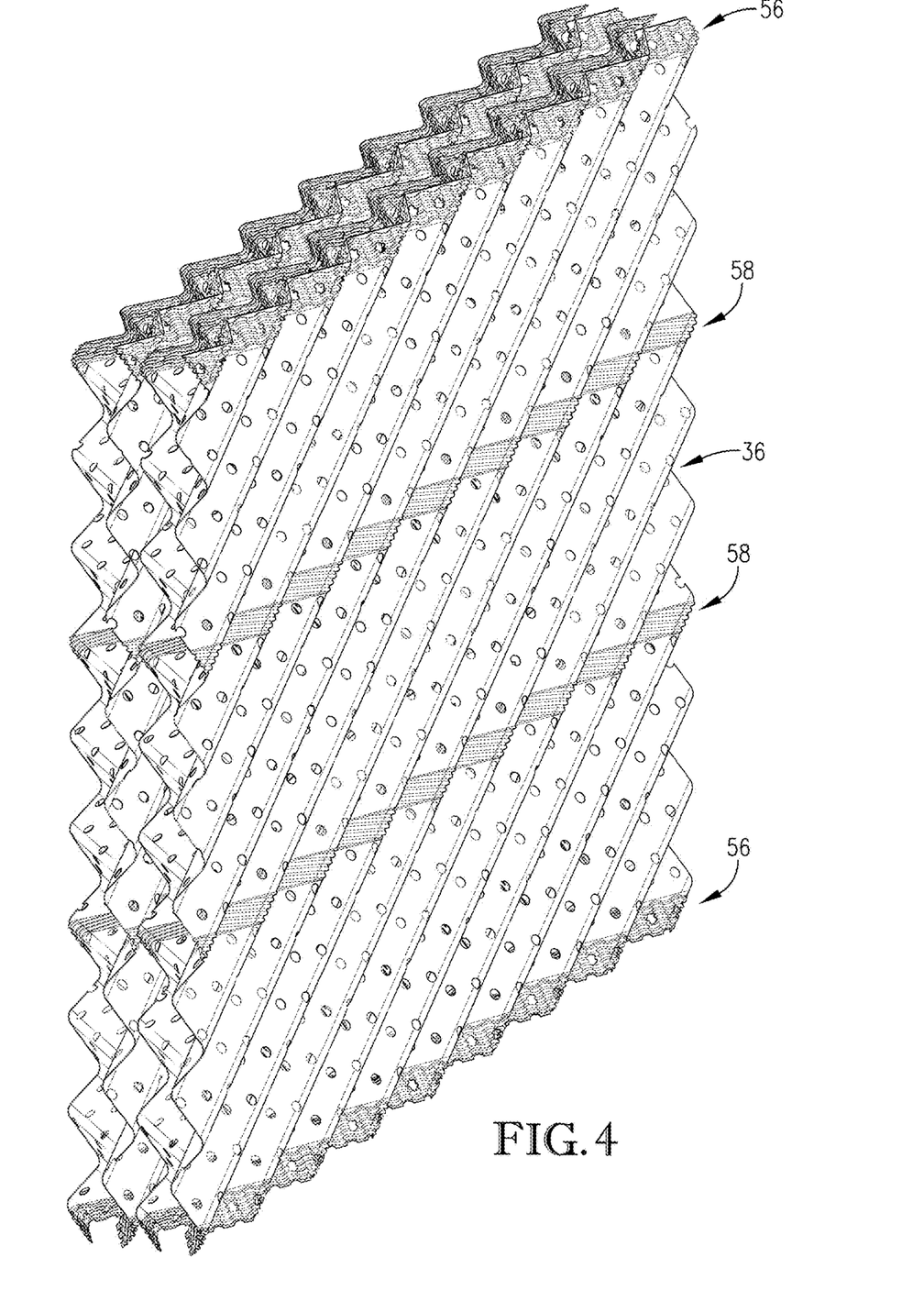
FIG. 4 is a side perspective view of four corrugated structured packing sheets that form a portion of a structured packing module and have apertures and an embodiment of surface texturing that comprises grooves and groove segments.

In another embodiment, the surface texturing comprises one or more rows of parallel grooves 56, as shown in FIG. 4, in one or both of an upper edge region that is adjacent to the upper edge 24 and a lower edge region that is adjacent to the lower edge 26 of the structured packing sheet 26. The grooves 56 serve to laterally distribute liquid as it is being received from the structured packing layer 16 above and as it is being delivered to the structured packing layer 16 below. The rows of grooves 56 are aligned with the upper edge 24 and the lower 26 and may extend continuously between the side edges 28 and 30. The grooves 56 may be wavy or otherwise non-linear to facilitate lateral distribution of the liquid even in situations where the upper and lower edges 24 and 26 do not extend exactly horizontally, whether because of a manufacturing error or imperfect installation of the structured packing layer 16. By positioning the grooves 56 at the upper edge region, any maldistribution of the liquid being transferred from one structured packing layer 16 to another can be partially or completely rectified. Similarly, positioning of the grooves 56 at the lower edge region serves to rectify any maldistribution of the liquid before it descends from one structured packing layer 16 into another structured packing layer.

In one embodiment of the grooves 56, they approximate a low-amplitude sine wave. The number of grooves 56 in the upper edge region may be the same or different from the number in the lower edge region. In one embodiment, the number of rows of grooves 56 is in the range of 1 to 10 in each of the upper and lower edge regions.

In another embodiment of the surface texturing, the grooves 56 may be used in combination with the grid of indented and raised structures 44 and 46 or in combination with any other type of conventional or non-conventional structures or other surface texturing. The grid of indented and raised structures 44 and 46 generally has a higher mass transfer efficiency than the grooves 56 and most of the surface area of the structured packing sheets 18 may contain the indented and raised structures 44 and 46. In one embodiment, the indented and raised structures 44 and 46 cover 70 to 95 percent of the total surface area of the structured packing sheets 18 and the grooves cover 5 to 30 percent of the total surface area.

Figure 5:
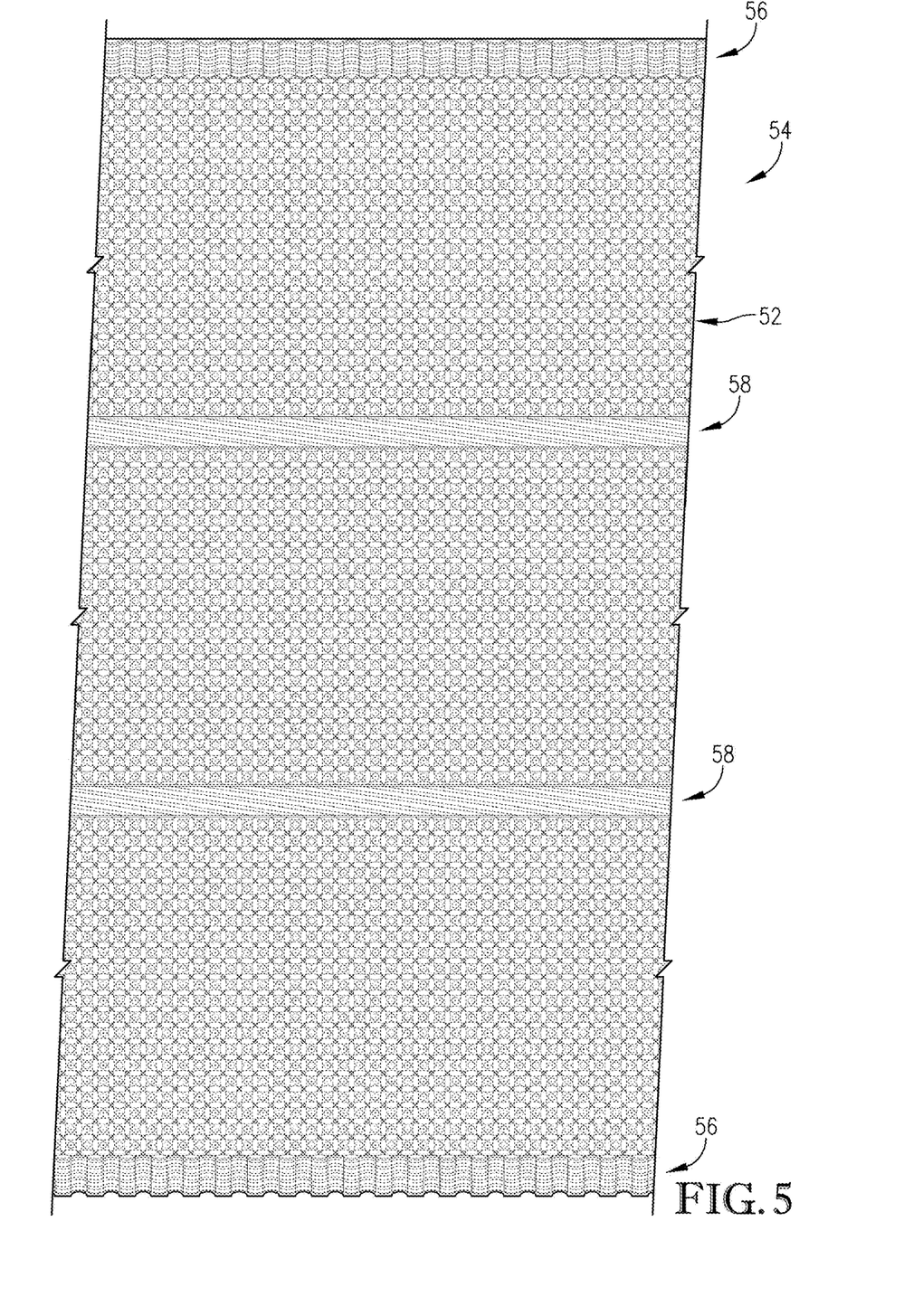
FIG. 5 is a front perspective view of a flat sheet of material before it is subjected to a crimping operation to form the corrugations, the sheet of material having apertures and an embodiment of surface texturing comprising the grooves, the groove segments, and the grid of indented and raised structures.

In a further embodiment of the surface texturing, one or more regions of rows of parallel groove segments 58 may be positioned in the bulk region to facilitate correction of any maldistribution of liquid as it flows through the bulk region. In one embodiment, these groove segments 58 are oriented so that they extend obliquely with reference to the upper and/or lower edge 24 or 26 of the structured packing sheet 18. The groove segments 58 are oriented with reference to the upper and/or lower edge 24 or 26. In one embodiment, the groove segments 58 are oriented at an angle that is 0 to 25 degrees, 5 to 15 degrees, or 7 to 10 degrees relative to the upper and/or lower edge 24 or 26. The number of rows of the parallel groove segments is in the range of 1 to 10 and the number of regions containing the rows of parallel groove segments 58 is in the range of 1 to 5. The groove segments 58 may be used in some applications in combination with both the grid of indented and raised structures 44 and 46 and the grooves 56. In other applications, the groove segments 58 may be used only with the grid of indented and raised structures 44 and 46. In these applications, the regions of groove segments 58 may occupy 5 to 30 percent of the surface area of the bulk region that would otherwise be occupied by the indented and raised structures 44 and 46.

In one embodiment, the lower edge 26 of the structured packing sheet 18 may also comprise a scalloped profile to facilitate liquid distribution.

From the foregoing, it will be seen that this invention is one well adapted to attain all the ends and objectives hereinabove set forth together with other advantages that are inherent to the structure.

It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative and not in a limiting sense.

The invention claimed is:

1. A structured packing module comprising:
 a plurality of structured packing sheets positioned in an upright, parallel relationship to each other, each structured packing sheet having opposite faces, an upper edge, a lower edge, a bulk region between the upper edge and the lower edge, and corrugations formed of alternating peaks and valleys that are interconnected by corrugation sidewalls and extend in an inclined direction that forms an oblique inclination angle in relation the upper edge and/or the lower edge of the structured packing sheet, the structured packing sheets being constructed and arranged such that the corrugations of adjacent ones of the structured packing sheets extend obliquely to each other; and surface texturing on the structured packing sheets comprising:
a grid of indented and raised structures in the bulk region with each indented structure being separated from some or all of adjacent ones of the indented structures by the raised structures, the raised structures forming rows of peaks and interconnecting saddles; and
microchannels that are formed by and extend along adjacent ones of the indented structures and the interconnecting saddles that are positioned between each of the adjacent ones of the indented structures, wherein the microchannels intersect the corrugation valleys at an angle in the range of 20 to 75 degrees.

2. The structured packing module of claim 1, wherein each indented structure is separated from all of the adjacent ones of the indented structures by the raised structures.

3. The structured packing module of claim 1, wherein the grid of indented and raised structures covers 70 to 95 percent of a total surface area of each structured packing sheet.

4. The structured packing module of claim 1, wherein the indented structures are arranged in parallel rows with the interconnecting saddles of the raised structures connecting adjacent indented structures within each row.

5. The structured packing module of claim 4, wherein each of the peaks of the raised structures is cone-shaped and is formed by a cone-shaped terminus of one of the indented structures on the opposite face of the structured packing sheet.

6. The structured packing module of claim 4, wherein the microchannels intersect the corrugation valleys at an angle in the range of 25 to 70 degrees.

7. The structured packing module of claim 4, wherein two of the microchannels extend obliquely to each other at each indented structure at a crossing angle that is in the range of 50 to 140 degrees.

8. The structured packing module of claim 7, wherein the crossing angle is in the range of 70 to 130 degrees.

9. The structured packing module of claim 4, wherein the microchannels extend linearly.

10. A structured packing sheet comprising:
opposite faces, an upper edge, a lower edge, a bulk region between the upper edge and the lower edge, and corrugations formed of alternating peaks and valleys that are interconnected by corrugation sidewalls and extend in an inclined direction that forms an oblique inclination angle in relation to the upper edge and/or the lower edge; and
surface texturing on the structured packing sheets comprising:
a grid of indented and raised structures in the bulk region with each indented structure being separated from some or all of adjacent ones of the indented structures by the raised structures, the raised structures forming rows of peaks and interconnecting saddles; and
microchannels that are formed by and extend along adjacent ones of the indented structures and the interconnecting saddles that are positioned between each of the adjacent ones of the indented structures, wherein the microchannels intersect the corrugation valleys at an angle in the range of 20 to 75 degrees.

11. The structured packing sheet of claim 10, wherein the indented structures are arranged in parallel rows with the interconnecting saddles of the raised structures connecting adjacent indented structures within each row.

12. The structured packing sheet of claim 11, wherein each of the peaks of the raised structures is cone-shaped and is formed by a cone-shaped terminus of one of the indented structures on the opposite face of the structured packing sheet.

13. The structured packing sheet of claim 11, wherein the microchannels intersect the corrugation valleys at an angle in the range of 25 to 70 degrees.

14. The structured packing sheet of claim 11, wherein two of the microchannels extend obliquely to each other at each indented structure at a crossing angle that is in the range of 50 to 140 degrees.

15. The structured packing sheet of claim 11, wherein the microchannels extend linearly.

16. The structured packing sheet of claim 10, wherein each indented structure is separated from all of the adjacent ones of the indented structures by the raised structures.

17. The structured packing module of claim 10, wherein the grid of indented and raised structures covers 70 to 95 percent of a total surface area of the structured packing sheet.

18. A structured packing sheet comprising:
opposite faces, an upper edge, a lower edge, a bulk region between the upper edge and the lower edge, and corrugations formed of alternating peaks and valleys that are interconnected by corrugation sidewalls and extend in an inclined direction that forms an oblique inclination angle in relation to the upper edge and/or the lower edge; and
surface texturing on the structured packing sheets comprising:
a grid of indented and raised structures in the bulk region with each indented structure being separated from all of adjacent ones of the indented structures by the raised structures, the raised structures forming rows of peaks and interconnecting saddles,
wherein the indented structures are arranged in parallel rows with the interconnecting saddles of the raised structures connecting adjacent indented structures within each row,
wherein each of the peaks of the raised structures is cone-shaped and is formed by a cone-shaped terminus of one of the indented structures on the opposite face of the structured packing sheet; and
microchannels that are formed by and extend along adjacent ones of the indented structures and the interconnecting saddles that are positioned between each of the adjacent ones of the indented structures, wherein the microchannels intersect the corrugation valleys at an angle in the range of 25 to 70 degrees and two of the microchannels extend obliquely to each other at each indented structure at a crossing angle that is in the range of 50 to 140 degrees.

19. The structured packing sheet of claim 18, wherein the microchannels extend linearly.

20. The structured packing module of claim 18, wherein the grid of indented and raised structures covers 70 to 95 percent of a total surface area of the structured packing sheet.

* * * * *